(12) United States Patent
Liba et al.

(10) Patent No.: US 12,530,788 B2
(45) Date of Patent: Jan. 20, 2026

(54) SYSTEM AND METHODS FOR DEPTH ESTIMATION

(71) Applicant: GOOGLE LLC, Mountain View, CA (US)

(72) Inventors: Orly Liba, Mountain View, CA (US); Rahul Garg, Mountain View, CA (US); Neal Wadhwa, Mountain View, CA (US); Jon Barron, Mountain View, CA (US); Hayato Ikoma, Mountain View, CA (US)

(73) Assignee: Google LLC, Mountain View, CA (US)

( * ) Notice: Subject to any disclaimer, the term of this patent is extended or adjusted under 35 U.S.C. 154(b) by 717 days.

(21) Appl. No.: 17/786,065

(22) PCT Filed: Dec. 24, 2020

(86) PCT No.: PCT/US2020/067044
§ 371 (c)(1),
(2) Date: Jun. 16, 2022

(87) PCT Pub. No.: WO2021/134031
PCT Pub. Date: Jul. 1, 2021

(65) Prior Publication Data
US 2023/0037958 A1    Feb. 9, 2023

Related U.S. Application Data

(60) Provisional application No. 62/954,392, filed on Dec. 27, 2019.

(51) Int. Cl.
*G06T 7/50* (2017.01)

(52) U.S. Cl.
CPC ...... *G06T 7/50* (2017.01); *G06T 2207/10028* (2013.01); *G06T 2207/20081* (2013.01); *G06T 2207/20084* (2013.01)

(58) Field of Classification Search
CPC ............ G06N 3/045; G06N 3/08; G06T 2207/10028; G06T 2207/20081; G06T 2207/20084; G06T 7/50; G06T 2207/2008
(Continued)

(56) References Cited

U.S. PATENT DOCUMENTS 10,790,056 B1 *   9/2020  Accomazzi ......... H04L 67/1097
10,929,654 B2 *   2/2021  Iqbal ..................... G06V 40/28
(Continued)

FOREIGN PATENT DOCUMENTS

CN      108898669 A    11/2018
EP       3166075 A1     5/2017

OTHER PUBLICATIONS

International Search Report for International Application No. PCT/US2020/067044 dated Apr. 1, 2021, 2 pages.
(Continued)

*Primary Examiner* — Kenny A Cese
(74) *Attorney, Agent, or Firm* — McDonnell Boehnen Hulbert & Berghoff LLP

(57) ABSTRACT

A system includes a computing device. The computing device is configured to perform a set of functions. The set of functions includes receiving an image, wherein the image comprises a two-dimensional array of data. The set of functions includes extracting, by a two-dimensional neural network, a plurality of two-dimensional features from the two-dimensional array of data. The set of functions includes generating a linear combination of the plurality of two-dimensional features to form a single three-dimensional input feature. The set of functions includes extracting, by a three-dimensional neural network, a plurality of three-dimensional features from the single three-dimensional input feature. The set of functions includes determining a two-
(Continued)

dimensional depth map. The two-dimensional depth map contains depth information corresponding to the plurality of three-dimensional features.

20 Claims, 4 Drawing Sheets

(58) Field of Classification Search
USPC .......................................................... 382/106
See application file for complete search history.

(56) References Cited

U.S. PATENT DOCUMENTS

| | | | |
|---|---|---|---|
| 2017/0132758 A1* | 5/2017 | Paluri | G06V 20/44 |
| 2019/0026956 A1 | 1/2019 | Gausebeck et al. | |
| 2019/0220992 A1 | 7/2019 | Li et al. | |
| 2020/0273192 A1* | 8/2020 | Cheng | G06V 10/454 |
| 2020/0327718 A1* | 10/2020 | Saragih | G06T 9/002 |

OTHER PUBLICATIONS

Cheng et al., "Learning Depth with Convolutional Spatial propagation Network", Oct. 4, 2019, pp. 1-18.
MWITI: "Research Guide for Depth Estimation with Deep Learning", Sep. 25, 2019, pp. 1-25.
Zhao et al., "Pyramid Scene Parsing Network", Dec. 4, 2016, 11 pages.
Shi et al., "Feature Enhanced Fully Convolutional Networks for Monocular Depth Estimation", 2019 IEEE International Conference on Data Science and Advanced Analytics (DSAA), 7 pages.

* cited by examiner

SYSTEM AND METHODS FOR DEPTH ESTIMATION

CROSS-REFERENCE TO RELATED APPLICATIONS

This application claims priority to U.S. provisional application Ser. No. 62/954,392 filed Dec. 27, 2019, which is incorporated herein by reference in its entirety and for all purposes.

BACKGROUND

Unless otherwise indicated herein, the materials described in this section are not prior art to the claims in this application and are not admitted to be prior art by inclusion in this section.

Images, such as red-green-blue (RGB) images, can be used for estimating depth information of an environment. For example, stereoscopic and multiscopic imaging systems can be used to generate depth maps that contain depth information of an environment.

In some contexts, a single image can be used for estimating depth information of an environment. Typically, two-dimensional features in an individual image are leveraged to estimate depth information. Depth information derived from a single image can sometimes be less accurate than that derived using other types of imaging systems.

SUMMARY

In a first example, a system is provided. The system includes a computing device. The computing device is configured to perform a set of functions. The set of functions includes receiving an image, wherein the image comprises a two-dimensional array of data. The set of functions includes extracting, by a two-dimensional neural network, a plurality of two-dimensional features from the two-dimensional array of data. The set of functions includes generating a linear combination of the plurality of two-dimensional features to form a single three-dimensional input feature. The set of functions includes extracting, by a three-dimensional neural network, a plurality of three-dimensional features from the single three-dimensional input feature. The set of functions includes determining a two-dimensional depth map. The two-dimensional depth map contains depth information corresponding to the plurality of three-dimensional features.

In a second example, a method is provided. The method includes receiving an image, wherein the image comprises a two-dimensional array of data. The method includes extracting, by a two-dimensional neural network, a plurality of two-dimensional features from the two-dimensional array of data. The method includes generating a linear combination of the plurality of two-dimensional features to form a single three-dimensional input feature. The method includes extracting, by a three-dimensional neural network, a plurality of three-dimensional features from the single three-dimensional input feature. The method includes determining a two-dimensional depth map. The two-dimensional depth map contains depth information corresponding to the plurality of three-dimensional features.

In a third example, a non-transitory computer readable medium is provided. The non-transitory computer readable medium has instructions stored thereon that when executed by a processor cause performance of a set of functions. The set of functions includes receiving an image, wherein the image comprises a two-dimensional array of data. The set of functions includes extracting, by a two-dimensional neural network, a plurality of two-dimensional features from the two-dimensional array of data. The set of functions includes generating a linear combination of the plurality of two-dimensional features to form a single three-dimensional input feature. The set of functions includes extracting, by a three-dimensional neural network, a plurality of three-dimensional features from the single three-dimensional input feature. The set of functions includes determining a two-dimensional depth map. The two-dimensional depth map contains depth information corresponding to the plurality of three-dimensional features.

Other aspects, embodiments, and implementations will become apparent to those of ordinary skill in the art by reading the following detailed description, with reference where appropriate to the accompanying drawings.

DETAILED DESCRIPTION

Figure 1:
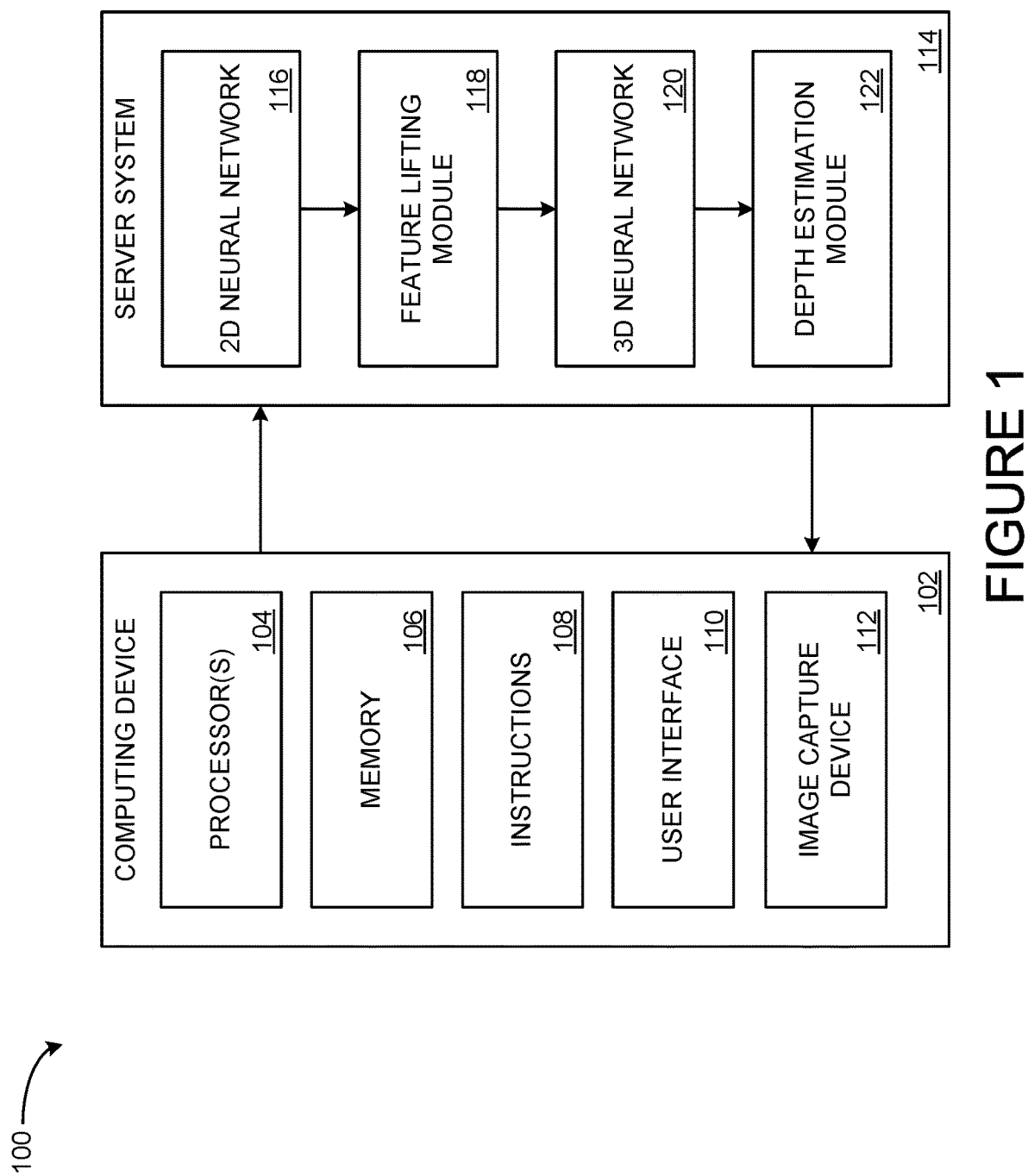
FIG. 1 is a block diagram of a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

I. Overview

Determining a depth map from a single image generally involves recognizing associations between distinct features extracted from an image (e.g., edges, points, and/or focus or defocus levels). For example, line angles, perspective, and other relationships between features can be used to determine relative distances between pixels in an image. As a simplified example, different edges on a rectangular object, such as a table or box, can indicate depth in an image by relative angles formed between the edges and based on relative sizes of the edges. More amorphous shapes can also provide an impression of depth. In many cases, a machine learning implementation can be leveraged to infer depth information from a monocular image (i.e., images taken from a single perspective relative to an environment). However, existing systems for monocular depth estimation may inaccurately represent depth. For example, such inaccuracies may result from not sensing occlusions present in the environment.

The examples described herein relate to a hybrid neural network configured to perform depth estimation of an individual image. In particular, described embodiments relate to processing an image using a two-dimensional convolutional neural network (2D CNN) to extract a plurality of two-dimensional features, and, based on the two-dimensional features, using a three-dimensional convolutional neural network (3D CNN) to extract a plurality of three-dimensional features. By applying a transform to the three-dimensional features, a depth map can be determined that accurately represents relative depths in an environment. As used herein, the term "convolutional neural network" refers to a type of deep neural network characterized by (i) one or more filters (otherwise referred to as "kernels") convolved with an input and (ii) pooling of multiple convolutional layers. A two-dimensional filter is associated with a 2D CNN and a three-dimensional filter is associated with a 3D CNN.

Advantageously, using a hybrid neural network in this manner produces a three-dimensional representation that detects the order of objects along a depth axis that are at least partially undetected by other systems. For example, order may refer to the order in a depth dimension, in which an object may be in front of other objects and occlude those objects. As used herein, the term "occlusions" refers to an aspect of an environment represented by an image that is not readily detectable due to characteristics of an image capture device used to capture the image or a system used for processing the image. For example, in a depth estimation context, occlusions may correspond to translucent materials (e.g., glass) that have a solid surface but are not always detected as being solid for depth estimation purposes due to being relatively clear. Other examples of occlusions may exist in the depth estimation context.

Within examples, the 2D CNN is used as a form of pre-processing to extract two-dimensional features from an image. As used herein, the term "two-dimensional features" relates to features extracted from a two-dimensional image, perhaps by a 2D CNN. It should be understood that these features may have two or more dimensions. The 2D CNN can be trained for classification of objects (e.g., shape detection, edge detection, face detection, etc.) and each two-dimensional feature may correspond to a class of object. In such examples, ground truth for training the 2D CNN can include correct classifications for objects in training images. The 3D CNN can receive an input that is based on the output of the 2D CNN. The 3D CNN can be trained for identifying three-dimensional features from the input. However, for the 3D CNN, ground truth may relate to a depth estimation associated with the input (e.g., a multiscopic depth estimation). Accordingly, when training the hybrid neural network, two different ground truths can be used to allow each neural network to perform its task more effectively. Namely, the 2D CNN can be used to recognize and extract two-dimensional features from a scene and the 3D CNN can be used to establish spatial relationships between the two-dimensional features. Sharing processing in this manner between two neural networks can provide robust and accurate results while potentially allowing for less processing, particularly with respect to the 3D CNN. For example, performing object detection when lifting two-dimensional features may allow for fewer hidden layers in the 3D CNN. Within examples, the 2D CNN and the 3D CNN can be trained together (e.g., using end-to-end training).

Within examples, the two-dimensional features output from the 2D CNN can be transformed prior to being input into the 3D CNN. For example, this may include forming a linear combination of the two-dimensional features to form a single-channel input for the 3D CNN. Accordingly, rather than providing the 3D CNN a multi-channel input of several two-dimensional features, example implementations include providing a single-channel input indicative of a three dimensional representation of the two-dimensional features.

Determining depth estimates from a monocular image relates to determining spatial relationships between features in the image. Using a hybrid neural network in the manner described herein allows for two or more different ways of establishing these spatial relationships, and therefore effectuates a robust and reliable way of estimating depth. Thus, the particular neural network architecture described provides an improvement to image processing technology.

II. Example Systems

FIG. 1 is a block diagram of a system, according to an example embodiment. In particular, FIG. 1 shows a system 100 having a computing device 102 and a server system 114. The computing device 102 includes processor(s) 104, a memory 106, and instructions 108 stored on the memory 106 and executable by the processor(s) 104 to perform functions.

The processor(s) 104 can include on or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are contemplated herein.

The memory 106 may include a computer readable medium, such as a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc. Other types of storage devices, memories, and media are contemplated herein.

The instructions 108 are stored on memory 106 and are executable by processor(s) 104 to carry out functions described herein.

Computing device 102 further includes a user interface 110 and an image capture device 112. The image user interface can include a touchscreen, a keyboard, or any other device configured to sense user input. The image capture device 112 can be any device configured to capture an image, such as an RGB image. For example, image capture device 112 can include a camera.

The server system 114 is communicatively coupled to computing device 102. Server system 114 is configured to receive an input image from computing device 102, and to generate a depth estimation of an environment captured by the input image. Server system 114 includes a 2D neural network 116, a feature lifting module 118, a 3D neural network 120, and a depth estimation module 122. These components of the server system 114 may be implemented in hardware (e.g., by using one or more specialized deep neural network computing devices) or in software (e.g., by connecting outputs of processors and/or computing devices together to carry out functionality of the neural networks). In certain implementations, server system 114 can represent a set of cloud servers associated with computing device 102. For example, computing device 102 can be a mobile device connected to a network provider, and the network provider can facilitate communication between computing device 102 and the set of cloud servers for storage and/or processing purposes. In other examples, server system 114 can be local to computing device 102 or combined with computing device 102. Other configurations of system 100 are possible. Server system 114 can include a plurality of computing devices having processors, memories, and instructions configured in a similar manner to those described above with respect to computing device 102.

The 2D neural network 116 can be a 2D CNN, a 2D shift invariant neural network (2D SINN), a 2D space invariant artificial neural network (2D SIANN), or another type of neural network configured for extracting two-dimensional features from images. Accordingly, though a 2D CNN is generally described throughout the forthcoming disclosure it should be understood that any neural network configured to perform similar functionality can be implemented. The 2D neural network 116 is configured to receive an image (e.g., a monocular image, such as an RGB image) from computing device 102, perhaps via a network. The 2D neural network 116 extracts a plurality of two-dimensional features and outputs them as a multi-channel output. For example, this may involve using at least one convolutional layer, a pooling layer, and one or more hidden layers configured to filter and downsample the image into a plurality of extracted two-dimensional features.

In some implementations, the 2D neural network 116 can be trained to recognize and classify various object in an image. In these examples, the 2D neural network can use a correct classification as ground truth during training. The extracted two-dimensional features may include filtered and down-sampled versions of the image that portray different objects recognized in the image. The 2D neural network 116 may be implemented in hardware (e.g., by using one or more specialized deep neural network computing devices) or in software (e.g., by connecting outputs of processors and/or computing devices together to carry out functionality of the neural networks).

The feature lifting module 118 is configured for converting a plurality of two-dimensional features extracted by the 2D neural network 116 into a three-dimensional input feature for the 3D neural network 120. The feature lifting module converts the two-dimensional features into a three-dimensional feature by determining a linear combination of two-dimensional features. For example, in examples in which the 2D neural network 116 classifies aspects of an input image and the two-dimensional features correspondingly relate to classified objects in the image, the linear combination can relate to an order of layering the classified objects. These layers can be combined to form a three-dimensional input. The feature lifting module 118 can be separate from or part of a computing device associated with the 2D neural network 116. For example, the feature lifting module 118 may be a specialized computing device configured for converting the plurality of two-dimensional features into a three-dimensional input for a 3D neural network.

The 3D neural network 120 can be a 3D CNN, a 3D shift invariant neural network (3D SINN), a 3D space invariant artificial neural network (3D SIANN), or another type of neural network configured for extracting three-dimensional features from an input or a plurality of inputs. Accordingly, though a 3D CNN is generally described throughout this disclosure it should be understood that any neural network configured to perform similar functionality can be implemented. The 3D neural network 120 can be configured to receive a multi-channel input, such as the two-dimensional features output from the 2D neural network 116, or a single-channel input, such as the three-dimensional input from the feature lifting module 118. The 3D neural network 120 extracts a plurality of three-dimensional features and outputs them as a multi-channel output. For example, this may involve using at least one convolutional layer, a pooling layer, and one or more hidden layers configured to filter and downsample the input or inputs into a plurality of extracted three-dimensional features. The three-dimensional features may be represented by voxels.

In some implementations, the 3D neural network 120 can be trained to determine three-dimensional aspects of an input. In particular, these 3D aspects may relate to relationships between two-dimensional features extracted by the 2D neural network 116. In these examples, the 3D neural network can use a correct or substantially correct depth estimate (e.g., a depth estimate of the environment in the image based on multiscopic imaging of the environment) as ground truth during training. The extracted three-dimensional features may include filtered and down-sampled versions of the input that portray different representations of depth in the input image. The 3D neural network 120 may be implemented in hardware (e.g., by using one or more specialized deep neural network computing devices) or in software (e.g., by connecting outputs of processors and/or computing devices together to carry out functionality of the neural networks).

The depth estimation module 122 can be configured to transform the plurality of three-dimensional features extracted by the 3D neural network into a two-dimensional depth map indicative of a depth estimate for the image, as described further below. The depth estimation module 122 can be separate from or part of a computing device associated with the 3D neural network 120. For example, the depth estimation module 122 may be a specialized computing device configured for converting the plurality of three-dimensional features into a two-dimensional depth map indicative of a depth estimate for the image.

Figure 2:
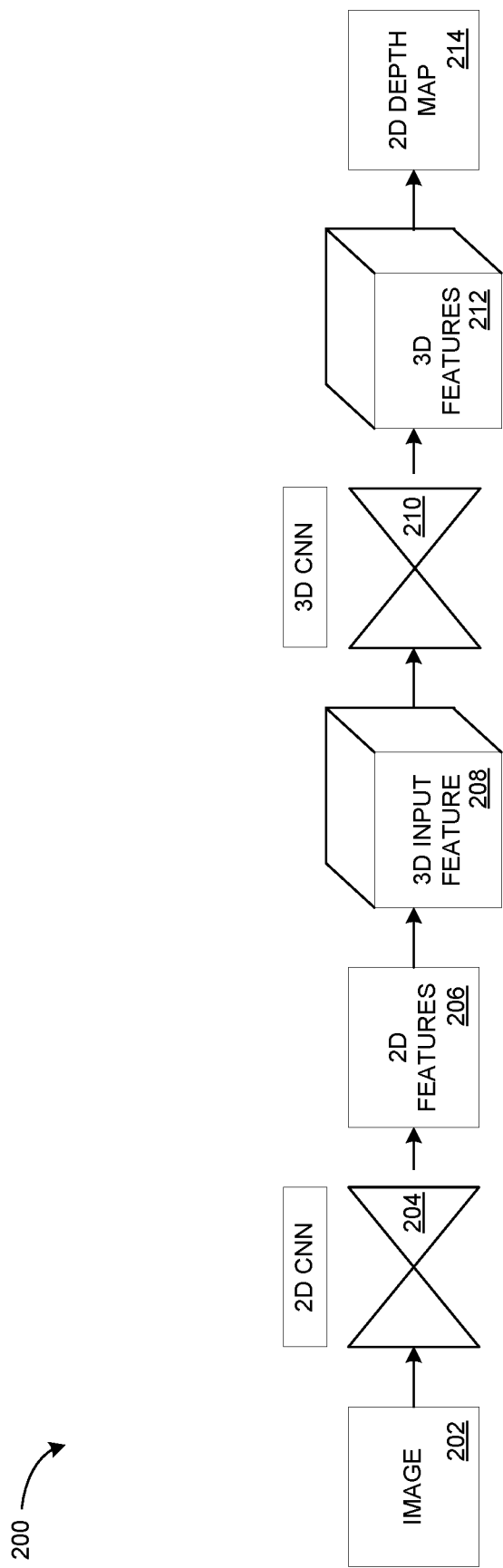
FIG. 2 is a flow chart of a method for depth estimation implemented by a system, according to an example embodiment.

FIG. 2 is a flow chart of a method for depth estimation using a system, according to an example embodiment. In particular, FIG. 2 shows a simplified representation of a method 200. Within examples, method 200 can be carried out using system 100 or a similar system. At block 202, method 200 includes receiving an image. For example, server system 114 can receive the image from computing device 102, perhaps via a network. The image can be a monocular RGB or grayscale image, and thus can represent a multi-channel or single-channel input, and include a two-dimensional array of data.

At block 204, method 200 includes using the image as an input into a 2D CNN. The 2D CNN is defined by one or more two-dimensional filters (e.g., 3×3 filters or 5×5 filters) applied to the input image in two directions. Over multiple convolutional and polling layers, different aspects of the image representing different features may be extracted into separate channels while simultaneously reducing the amount of data to be processed. These aspects of the image can then be provided to a fully-convolutional, fully-connected, or partially-connected neural network to output two-dimensional features. In examples where the 2D CNN is trained for classifying images, different two-dimensional features can represent different types of objects in the input image.

At block 206, method 200 includes receiving a plurality of two-dimensional features from the 2D CNN. For example, a computing device associated with formatting data for a 3D CNN can receive the two-dimensional features from the 2D CNN.

At block 208, method 200 includes determining a three-dimensional input feature for the 3D CNN based on the plurality of two-dimensional output features. Determining the three-dimensional input feature involves determining a linear combination of the plurality of two-dimensional features received from the 2D CNN. The linear combination can facilitate effective three-dimensional convolution by placing similar features more closely to one another. For example, features that represent the same object classified by the 2D CNN can be combined or ordered in adjacent layers of a three-dimensional array that forms the three-dimensional input feature for the 3D CNN.

At block 210, method 200 includes using the three-dimensional input feature as an input for the 3D CNN. The 3D CNN is defined by one or more three-dimensional filters (e.g., 3×3×3 filters or 5×5×5 filters) applied to the input image in three directions. Over multiple convolutional and polling layers, different aspects of the three-dimensional input feature representing different three-dimensional features may be extracted into separate channels while simultaneously reducing the amount of data to be processed. These aspects of the image can then be provided to a fully-connected or partially-connected neural network to output a plurality of three-dimensional features. The 3D CNN advantageously is configured to extract features in three directions, and thus is configured to extract features indicative of depth. Accordingly, combining the two-dimensional features from the 2D CNN such that similar features (e.g., features representing the same object) are included in adjacent layers of a three-dimensional array allows the 3D CNN to more effectively extract depth information.

At block 212, method 200 includes receiving a plurality of three-dimensional features from the 3D CNN. For example, a computing device associated with generating a two-dimensional depth map can receive the three-dimensional features from the 3D CNN.

At block 214, method 200 includes generating a two-dimensional depth map based on the plurality of three-dimensional features received from the 3D CNN. In this context, a two-dimensional depth map refers to a two-dimensional array of depth estimates, where each depth estimate corresponds to one or more pixels in the input image. Further details with respect to the functions of block 214 are described below with respect to FIG. 3.

Figure 3:
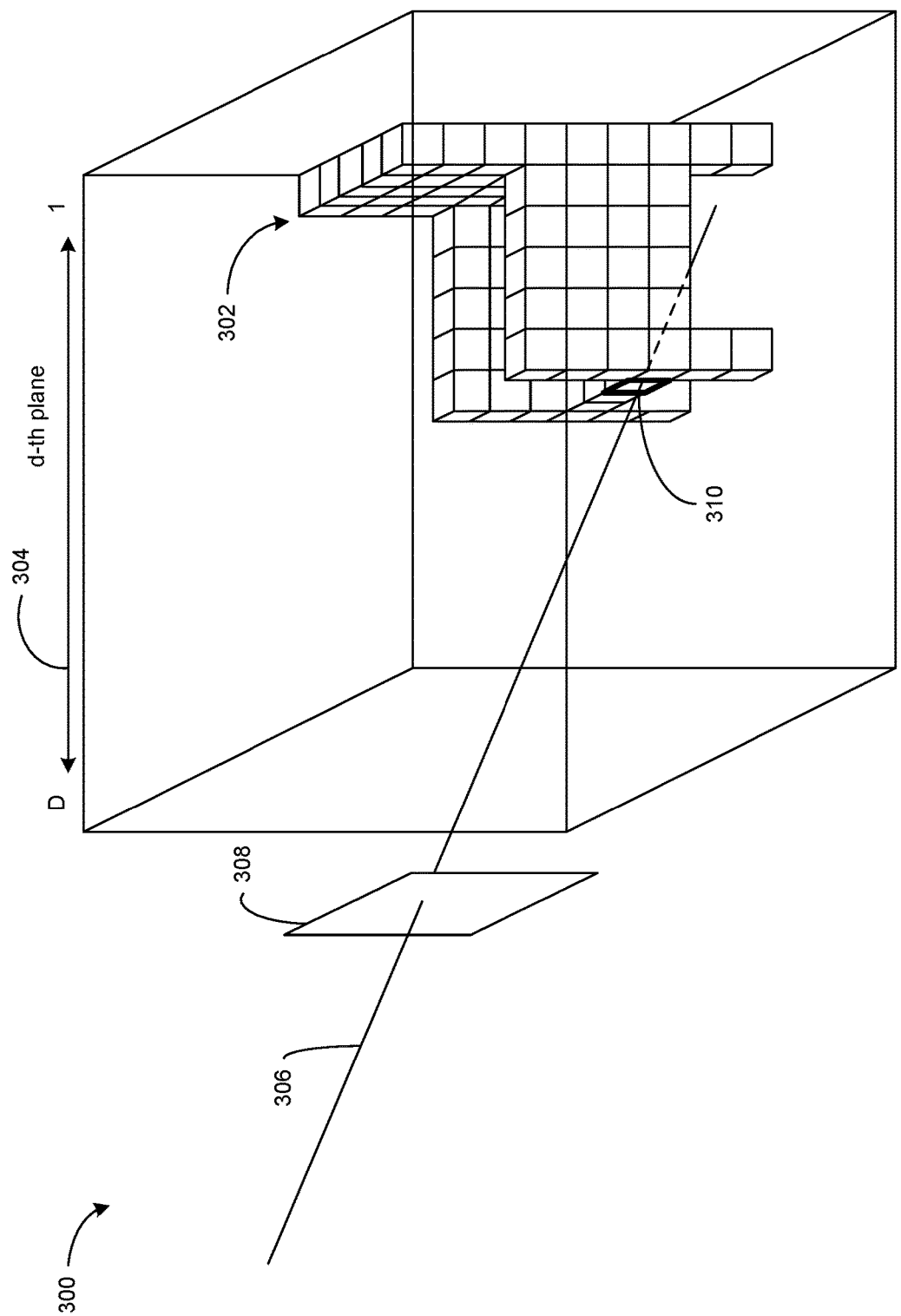
FIG. 3 illustrates a three-dimensional feature being converted to a depth estimation, according to an example embodiment.

FIG. 3 illustrates a three-dimensional feature being converted to a depth estimation, according to an example embodiment. In particular, FIG. 3 shows a three-dimensional feature 300 that is being input into a transform that calculates a depth for a given point in an array of depth estimates. The transform determines which voxels output by the 3D CNN are opaque, and calculates a depth of each opaque voxel based on a path length between a virtual pose of the image capture device when capturing the image and the closest opaque voxel in the three-dimensional feature 300 along the path. As shown, the three-dimensional feature 300 is a three-dimensional array of voxels, some being transparent and some being opaque. An over operator transform can be applied to each voxel for purposes of calculating depth by iteratively determining which opaque voxel is closest to the location and orientation of the image capture device. The pose of the image capture device can operate as a focal point from which each path begins.

In the present example, an object 302 has been extracted as part of a three-dimensional feature output by the 3D CNN. The over operator transform operates in a distance plane (otherwise referred to as a "d-th plane") 304 of the three-dimensional feature 300 that corresponds to the pose of the image capture device when capturing the image. A plurality of paths, including a path 306, map to a two-dimensional array of depth estimations 308 (e.g., a depth map). For purposes of simplicity, path 306 is depicted as only encountering one opaque voxel, voxel 310. However, in other examples, the path may intersect with several opaque voxels. To determine a closest opaque voxel, the transform may be represented by the following equation, in which "d" corresponds to the "d-th plane" as shown in FIG. 3, "M" corresponds to a set of voxels (both transparent and opaque) intersected by a path (e.g., path 306) and "$(1-\alpha_i)$" corresponds to the opacity of each voxel.

$$O(M) = \sum_{d=1}^{D} \prod_{i=d+1}^{D} (1 - \alpha_i)$$

Iterating through this summation/product loop provides a highest value for an opaque voxel that is closest to the pose of the camera when capturing the image. An "opaque" voxel in this context may be a voxel having an opaqueness above a threshold opacity (e.g., 0.95). In the present example, since only opaque voxel 310 is intersected by path 306, voxel 310 is used for calculating depth, which corresponds to the length of path 306 before reaching voxel 310. Other transformations can be applied to three-dimensional features in order to determine a depth map.

III. Example Methods

Figure 4:
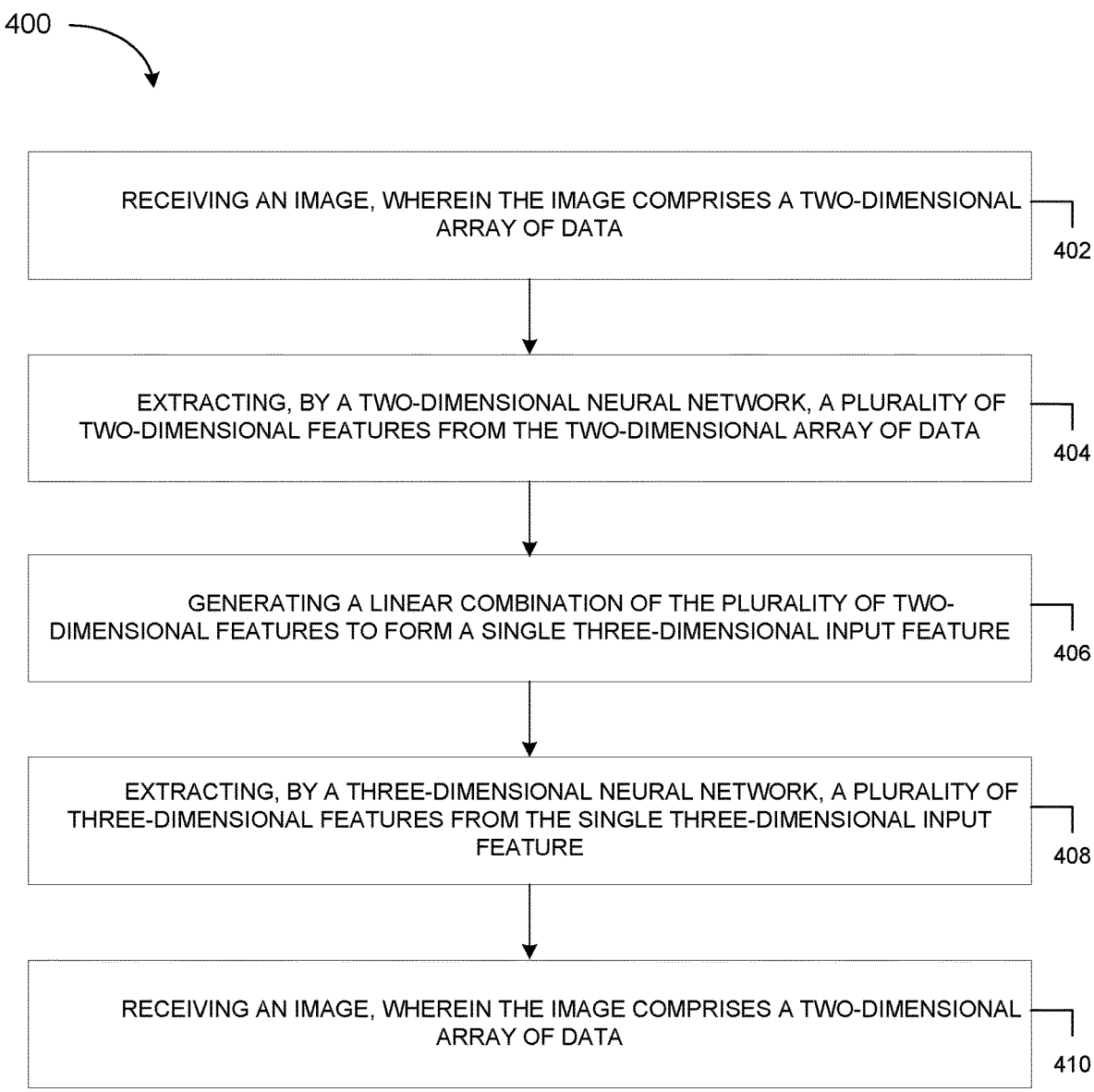
FIG. 4 is a block diagram of a method, according to an example embodiment.

FIG. 4 is a block diagram of a method, according to an example embodiment. In particular, FIG. 4 depicts a method 400 for use in generating a depth estimation of an image using a hybrid neural network structure. Method 400 may be implemented in accordance with FIGS. 1, 2, 3, components thereof, or the description thereof. For examples, aspects of the functions of method 400 may be performed by computing device 102, server system 114, one or more computing devices, or by logical circuitry configured to implement the functions described above.

At block 402, method 400 includes receiving an image. For example, this may involve receiving an image from image capture device 112 described above with respect to FIG. 1. The image can include a two-dimensional array of data that represents an environment in which the image capture device captures the image. For example, the image can be a grayscale or RGB image. Other types of images are possible.

At block 402, method 400 includes extracting, by a two-dimensional neural network, a plurality of two-dimensional features from the two-dimensional array of data. For example, this may be performed in accordance with the description of 2D neural network 116 or with blocks 204 and 206 provided above.

At block 404, method 400 includes generating a linear combination of the plurality of two-dimensional features to form a single three-dimensional input feature. For example, this may be performed in accordance with the description of feature lifting module 118 or with block 206 provided above.

At block 406, method 400 includes extracting, by a three-dimensional neural network, a plurality of three-dimensional features from the single three-dimensional input feature. For example, this may be performed in accordance with the description of 3D neural network 120 or with blocks 210 and 212 provided above.

At block 408, method 400 includes determining a two-dimensional depth map. The two-dimensional depth map contains depth information corresponding to the plurality of three-dimensional features. For example, this may be performed in accordance with the description of depth estimation module 122, with blocks 212 and 214, or with three-dimensional feature 300 provided above.

Within examples, the two-dimensional neural network includes a two-dimensional convolutional neural network (2D CNN). For example, the 2D CNN may operate as described with respect to blocks 202, 204, and 206 depicted in FIG. 2. In such examples, the three-dimensional neural network can include a three-dimensional convolutional neural network (3D CNN). For example, the 3D CNN may operate as described with respect to blocks 208, 210, and 212 depicted in FIG. 2. In examples involving a 2D CNN, extracting the plurality of two-dimensional features can include using the 2D CNN as a two-dimensional filter that operates in two directions within the two-dimensional array of data to output the plurality of two-dimensional features. For example, the 2D CNN can use a plurality of filters (i.e., "kernels") used to extract different features in the image.

In examples involving a 2D CNN, method 200 further includes, prior to extracting the plurality of two-dimensional features, training the 2D CNN using a plurality of images representing objects such that different nodes within the two-dimensional convolutional neural network operate to output different types of two-dimensional features corresponding to different objects. For example, the 2D CNN can be trained to classify images, and each feature may relate to a classified object in the image. In such examples, generating the linear combination of the plurality of two-dimensional features to form the single three-dimensional input feature includes classifying a two-dimensional feature of the plurality of two-dimensional features in accordance with an object associated with training the two-dimensional convolutional neural network, and generating the linear combination of the plurality of two-dimensional features based on classifying the two-dimensional feature. For example, the plurality of two-dimensional features can be stacked and/or ordered based on how different identified objects overlap in the image. Other ways of combining two-dimensional features are possible.

In related examples, the 3D CNN can be trained based on inputs formed from the plurality of two-dimensional features extracted by the 2D CNN using a ground truth related to depth estimation. For example, the ground truth may be generated from a depth map formed from multiscopic images of the same environment captured by the image input to the 2D CNN. In this manner, a hybrid neural network configuration is provided that used two different types of ground truths when training the 2D CNN and the 3D CNN.

In examples involving the 3D CNN, extracting the plurality of three-dimensional features comprises using the 3D CNN as a three-dimensional filter that operates in three directions within the three-dimensional input feature to output the plurality of three-dimensional features. For example, the 3D CNN can use a plurality of filters (i.e., "kernels") used to extract different features from the single three-dimensional input.

Within examples, extracting the plurality of three-dimensional features from the single three-dimensional input feature includes extracting a plurality of sets of voxels, in which each voxel indicates a level of opaqueness. For example, these three-dimensional features can be similar to the three-dimensional feature 300 depicted in FIG. 3. Within these examples, determining the two-dimensional depth map comprises determining a plurality of path lengths. Each path length represents a distance between a focal point and an opaque voxel. For example, an over operator transformation can be applied to a plurality of voxels to determine which opaque voxel is closest to the origin of a plurality of corresponding paths. Determining which voxels are opaque may include comparing voxels with a threshold opacity (e.g., 0.95).

Within examples, generating the linear combination of the plurality of two-dimensional features to form the single three-dimensional input feature corresponds to ordering two-dimensional features. In examples in which the two-dimensional features relate to classified objects in an image, the linear combination can be based on which features overlap, and ordering the two-dimensional features accordingly.

Within examples, the plurality of two-dimensional features corresponds to a multi-channel output of the two-dimensional neural network, and generating the linear combination of the plurality of two-dimensional features to form the single three-dimensional input feature includes transforming the multi-channel output of the two-dimensional neural network into a single-channel input of the three-dimensional neural network.

As noted above, though convolutional neural networks are described herein, other types of machine learning implementations are possible. However, using a convolutional neural network in this context advantageously allows for reduced data for processing as a result of convolution and polling, and also allows for extraction of spatial relationships. By combining aspects of two different neural networks, the examples described herein provide a robust and accurate depth estimation using a monocular image rather than multiple images, radar data, light detection and ranging (LIDAR) data, or other similar data, increasing flexibility of the system. Further, such operations allow for improved sensing of occlusions by emphasizing the order of two-dimensional features output by the 2D neural network. Thus, the particular architecture and corresponding operations described herein provide benefits to image processing technology by reducing the data required to determine a depth map, and improving detection of occlusions in an image.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system for determining a two-dimensional depth map from a single monocular image, the system comprising:
    a computing device, wherein the computing device is configured to perform a set of functions comprising:
    receiving a single monocular image, wherein the image comprises a two-dimensional array of data;
    extracting, by a two-dimensional neural network, a plurality of two-dimensional features from the two-dimensional array of data;
    generating a linear combination of the plurality of two-dimensional features to form a single three-dimensional input feature;
    extracting, by a three-dimensional neural network, a plurality of three-dimensional features from the single three-dimensional input feature; and
    determining a two-dimensional depth map, wherein the two-dimensional depth map contains depth information corresponding to the plurality of three-dimensional features.

2. The system of claim 1, wherein the computing device is a first computing device of a plurality of computing devices, and wherein the two-dimensional neural network and the three-dimensional neural network correspond to at least a second computing device of the plurality of computing devices.

3. The system of claim 1, wherein the two-dimensional neural network comprises a two-dimensional convolutional neural network, wherein the three-dimensional neural network comprises a three-dimensional convolutional neural network, and wherein extracting the plurality of two-dimensional features comprises using the two-dimensional convolutional neural network as a two-dimensional filter that operates in two directions within the two-dimensional array of data to output the plurality of two-dimensional features.

4. The system of claim 3, the set of functions further comprising:
    prior to extracting the plurality of two-dimensional features, training the two-dimensional convolutional neural network using a plurality of images representing objects such that different nodes within the two-dimensional convolutional neural network operate to output different types of two-dimensional features corresponding to different objects.

5. The system of claim 1, wherein generating the linear combination of the plurality of two-dimensional features to form the single three-dimensional input feature comprises:
    classifying a two-dimensional feature of the plurality of two-dimensional features in accordance with an object associated with training the two-dimensional convolutional neural network; and
    generating the linear combination of the plurality of two-dimensional features based on classifying the two-dimensional feature.

6. The system of claim 1, wherein the two-dimensional neural network comprises a two-dimensional convolutional neural network, wherein the three-dimensional neural network comprises a three-dimensional convolutional neural network, and wherein extracting the plurality of three-dimensional features comprises using the three-dimensional convolutional neural network as a three-dimensional filter that operates in three directions within the three-dimensional input feature to output the plurality of three-dimensional features.

7. The system of claim 1, wherein the two-dimensional neural network comprises a two-dimensional convolutional neural network, wherein the three-dimensional neural network comprises a three-dimensional convolutional neural network, and wherein extracting the plurality of three-dimensional features from the single three-dimensional input feature comprises extracting a plurality of sets of voxels, wherein each voxel indicates a level of opaqueness.

8. A method for determining a two-dimensional depth map from a single monocular image, the method comprising:
    receiving a single monocular image, wherein the image comprises a two-dimensional array of data;
    extracting, by a two-dimensional neural network, a plurality of two-dimensional features from the two-dimensional array of data;
    generating a linear combination of the plurality of two-dimensional features to form a single three-dimensional input feature;
    extracting, by a three-dimensional neural network, a plurality of three-dimensional features from the single three-dimensional input feature; and
    determining a two-dimensional depth map, wherein the two-dimensional depth map contains depth information corresponding to the plurality of three-dimensional features.

9. The method of claim 8, further comprising:
    determining, based on the plurality of three-dimensional features extracted by the three-dimensional neural network, a three-dimensional array of voxels, each voxel of the array indicating a respective level of opaqueness, and
    wherein determining a two-dimensional depth map comprises, for a plurality of pixels of the two-dimensional depth map, determining respective distances between a capture device location and a respective closest opaque voxel of the array of voxels along a respective different path from the capture device location.

10. The method of claim 8, wherein each two-dimensional feature extracted by the two-dimensional neural network represents a respective different objects in the image.

11. The method of claim 10, wherein generating the linear combination of the plurality of two-dimensional features to form the single three-dimensional input feature comprises ordering the two-dimensional features based on overlap between the respective different objects in the image.

12. The method of claim 8, wherein the two-dimensional neural network comprises a two-dimensional convolutional neural network, wherein the three-dimensional neural network comprises a three-dimensional convolutional neural network, and wherein extracting the plurality of two-dimensional features comprises using the two-dimensional convolutional neural network as a two-dimensional filter that operates in two directions within the two-dimensional array of data to output the plurality of two-dimensional features.

13. The method of claim 12, further comprising:
prior to extracting the plurality of two-dimensional features, training the two-dimensional convolutional neural network using a plurality of images representing objects such that different nodes within the two-dimensional convolutional neural network operate to output different types of two-dimensional features corresponding to different objects.

14. The method of claim 13, wherein generating the linear combination of the plurality of two-dimensional features to form the single three-dimensional input feature comprises:
classifying a two-dimensional feature of the plurality of two-dimensional features in accordance with an object associated with training the two-dimensional convolutional neural network; and
generating the linear combination of the plurality of two-dimensional features based on classifying the two-dimensional feature.

15. The method of claim 8, wherein the two-dimensional neural network comprises a two-dimensional convolutional neural network, wherein the three-dimensional neural network comprises a three-dimensional convolutional neural network, and wherein extracting the plurality of three-dimensional features comprises using the three-dimensional convolutional neural network as a three-dimensional filter that operates in three directions within the three-dimensional input feature to output the plurality of three-dimensional features.

16. The method of claim 8, wherein extracting the plurality of three-dimensional features from the single three-dimensional input feature comprises extracting a plurality of sets of voxels, wherein each voxel indicates a level of opaqueness.

17. The method of claim 16, wherein determining the two-dimensional depth map comprises determining a plurality of path lengths, wherein each path length represents a distance between a focal point and an opaque voxel.

18. The method of claim 8, wherein generating the linear combination of the plurality of two-dimensional features to form the single three-dimensional input feature corresponds to ordering two-dimensional features.

19. The method of claim 8, wherein the plurality of two-dimensional features corresponds to a multi-channel output of the two-dimensional neural network, and wherein generating the linear combination of the plurality of two-dimensional features to form the single three-dimensional input feature comprises transforming the multi-channel output of the two-dimensional neural network into a single-channel input of the three-dimensional neural network.

20. A non-transitory computer readable medium having instructions stored thereon that when executed by a processor cause performance of a set of functions, wherein the set of functions is for determining a two-dimensional depth map from a single monocular image and comprises:
receiving a single monocular image, wherein the image comprises a two-dimensional array of data;
extracting, by a two-dimensional neural network, a plurality of two-dimensional features from the two-dimensional array of data;
generating a linear combination of the plurality of two-dimensional features to form a single three-dimensional input feature;
extracting, by a three-dimensional neural network, a plurality of three-dimensional features from the single three-dimensional input feature; and
determining a two-dimensional depth map, wherein the two-dimensional depth map contains depth information corresponding to the plurality of three-dimensional features.

* * * * *